Aug. 9, 1955 J. W. SAWYER 2,714,974
COMPARTMENTED CONTAINER FOR LIQUIDS
Original Filed March 2, 1949

INVENTOR
JOHN W. SAWYER
BY
ATTORNEY

United States Patent Office 2,714,974
Patented Aug. 9, 1955

2,714,974
COMPARTMENTED CONTAINER FOR LIQUIDS

John W. Sawyer, Arlington, Va.

Original application March 2, 1949, Serial No. 79,264. Divided and this application October 24, 1949, Serial No. 123,281

1 Claim. (Cl. 222—94)

(Granted under Title 35, U. S. Code (1952), sec. 266)

This invention relates generally to the art of construction of plastic replicas of surface elements such as gears, bearings, boiler tube interiors, and more specifically to the container and dispenser for the plastic material of which the replica is made. This application is a division of Serial Number 79,264 filed March 2, 1949, now Patent No. 2,601,703, July 1, 1952, for Method and Apparatus for Testing Surface Defects.

The invention of the parent application relates to apparatus and methods employed in forming minutely accurate negative replicas of worn or injured machine element surfaces or other surfaces of which it is desired to construct an exact model for inspection or laboratory test purposes. These are formed of a liquid plastic of low viscosity so that the casting material can be poured into a mold or other retaining device, after which the plastic is hardened in place against the surface against which it is held. This plastic material is chemically hardened through the agency of activators and catalysts which must be mixed with the plastic and filler just before use. The parent application discloses various types of plastics and hardening agents suitable for the purpose.

The materials of a chemically hardened plastic must be accurately measured and stored separately in order to provide proper proportions of the materials to be mixed as needed in various locations, usually far from the laboratory of source of supply of the materials. The quantity required is small for any particular use, and suitable storage means is essential to the convenient use of the testing means and method of the parent case. Other storage means than herein disclosed are available, of which one form is disclosed in the parent case. The present application relates to a greatly improved form of container, in which a single package contains metered amounts of the several components of the mixture, and to means for mixing the components at the time of use without danger of loss of any of the material from the several containers within the package, and without exposure of the components to the air or to each other prior to mixing.

An object of the present invention is accordingly to provide a single-package dispensing container for the plastic casting material employed in making negative surface replicas.

Other objects and features of the invention will become apparent to those skilled in the art as the disclosure is made in the following description of a preferred embodiment of the invention as illustrated in the accompanying sheet of drawings in which.

Figure 1:
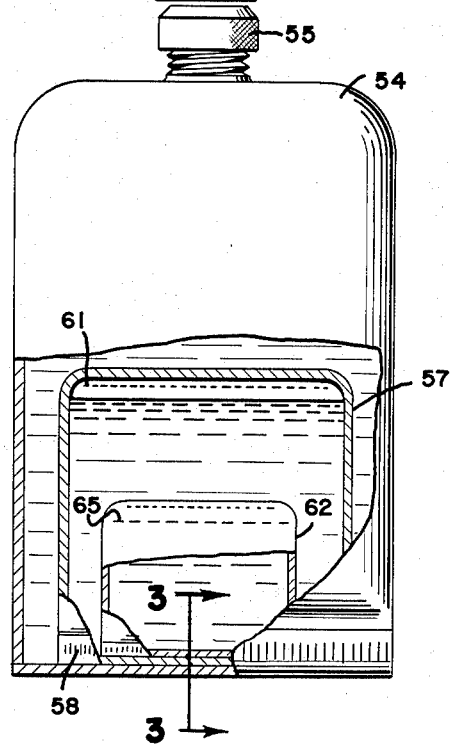
Fig. 1 is a front elevation partly in section of a collapsible tube container for plastic, catalyst and activator liquids.
Figure 2:
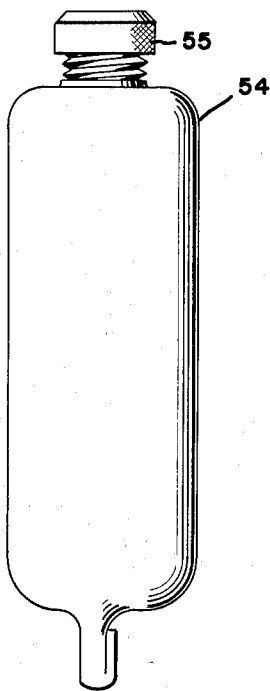
Fig. 2 is a side elevation of the tube of Fig. 1.

In the preparation of a plastic for reproduction of a surface according to this invention it is found convenient to employ a package containing a plastic matrix in which the filler is already mixed, the whole mass having a watery consistency so as to be free-flowing and easy of application. Usually within the same container is enclosed a second package or tube containing a second liquid comprising the activator, plasticizer, catalyst and other materials found necessary or desirable so that a complete mixture is readily available upon the opening of a single container. Separate containers for the two or three fluids thus employed are sealed against the air and against mixing in a number of different ways, two of which are illustrated in the drawings.

Figure 4:
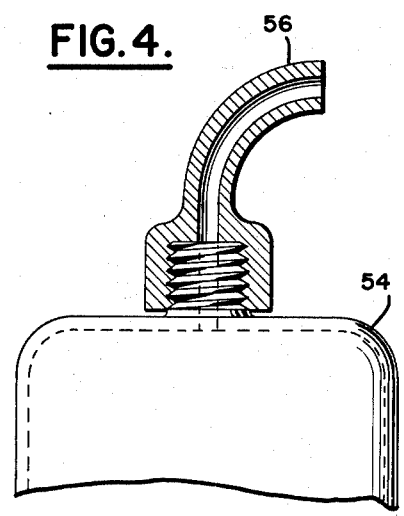
Fig. 4 is a sectional view of an applicator attached to the tube of Fig. 1.

According to the preferred embodiment there is shown in Fig. 1 a flexible tube 54 fitted with a storage cover or screw cap 55 which seals the tube 54 and which may be removed and replaced by a suitable applicator nozzle 56 as illustrated in Fig. 4. The tube 54 may be of metal foil or of any plastic material which is not affected by the liquid plastic contained therein. This tube is normally closed at the end opposite the screw cover by a crimping operation, heat seal, or other suitable conventional means. In the form illustrated this tube contains a second flexible tube 57 within which is stored the plasticizer, activator, accelerator, catalyst, and other components of the mixture which must be stored separately from the plastic base contained in the tube 54.

This inner tube 57, as illustrated, is conveniently sealed separately by a crimping or heat sealing operation shown generally at 58, this tube having a tab 59 or extension at the sealed end which is inserted at the open end of the outer tube 54 between the sides thereof and held there temporarily while the outer tube is filled and crimped or otherwise sealed. Thus when the outer tube is filled and the inner tube placed therein and the seal made, both liquids are contained in separate packages in a single outer package.

The location of the inner package within the outer package is definitely fixed such that the mixing of the two liquids is facilitated as follows: A slight pressure on the outer tube in the region surrounding the inner tube causes a rupture of the inner tube material because of its thinner and weaker construction, or because of scoring illustrated at 61 in the drawing. A small pressure on the outer tube thus causes a rupture and mixing of the two fluids, and the operator is easily able to tell when the inner tube is broken by the decrease in resistance to hand pressure. Because of the location of the inner tube within the outer in a definite fixed location metal foil or other nontransparent material may be used for holding and storing the liquids.

Figure 3:
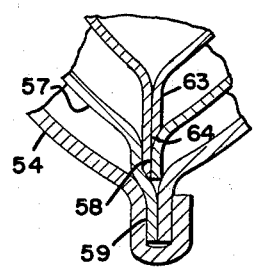
Fig. 3 is a sectional detail of sealing means securing three containers in fixed positional relationship.

In the event three liquids are required, a third package 62 smaller than the second may be inserted within the second and sealed as at 63 in the manner hereinbefore described and provided with tab 64 for sealing in seal 58. As illustrated in Fig. 3 the innermost tube is in a definite location within the second tube and hence easily ruptured so that the third liquid may be mixed with the second prior to mixing of the second fluid with the fluid in the outer tube. This is facilitated by forming the innermost tube 62 of material thinner than that of the outer tubes or by more deeply scoring the free end thereof as at 65. It is found that the tubes constructed in this manner may be readily manipulated by the operator, though made of opaque material, when located definitely and securely fastened to the crimped or sealed edge of the outer tube, as illustrated.

Obviously various modifications and variations of the present invention are possible in the light of the above teachings. It is therefore to be understood that, within the scope of the appended claim, the invention may be practiced otherwise than as specifically described.

The invention described herein may be manufactured and used by or for the Government of the United States of America for governmental purposes without the payment of any royalties thereon or therefor.

What is claimed is:

A combined container and dispenser for a plurality of mutually reacting liquids comprising, an outer flexible walled container closeable at an upper end by a hollow threaded connector and terminating at its other end in a seal, an applicator nozzle, means on said applicator nozzle for selectively securing the latter to said connector, a second flexible closed container in said outer container sealed at the ends and having a tab at one end thereof secured in a fixed position in the outer container, a third flexible closed container in said second container and secured therein in fixed position adjacent said tab, scoring in a side wall of said third container rendering it more easily ruptured than said second container, scoring in a side wall of said second container making it more easily ruptured than said outer container, whereby the third container may be emptied into the second container and the second container emptied into the outer container and the mixed contents exhausted through said applicator.

References Cited in the file of this patent

UNITED STATES PATENTS

| | | |
|---|---|---|
| 1,332,985 | Jarrett | Mar. 9, 1920 |
| 1,699,532 | Hopkins | Jan. 22, 1929 |
| 2,034,799 | Crain | Mar. 24, 1936 |
| 2,058,251 | Nitardy et al. | Oct. 20, 1936 |
| 2,176,923 | Nitardy | Oct. 24, 1939 |
| 2,469,204 | Peters | May 3, 1949 |
| 2,529,837 | Denison | Nov. 14, 1950 |